(12) United States Patent
Yamakage et al.

(10) Patent No.: US 9,423,185 B2
(45) Date of Patent: Aug. 23, 2016

(54) HEAT TRANSFER DEVICE

(75) Inventors: Hisaaki Yamakage, Minato-ku (JP);
Yoshihito Yamada, Minato-ku (JP);
Masato Hanada, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 1124 days.

(21) Appl. No.: 13/497,189

(22) PCT Filed: Nov. 4, 2009

(86) PCT No.: PCT/JP2009/068832
§ 371 (c)(1),
(2), (4) Date: Mar. 20, 2012

(87) PCT Pub. No.: WO2011/055430
PCT Pub. Date: May 12, 2011

(65) Prior Publication Data
US 2012/0175083 A1    Jul. 12, 2012

(51) Int. Cl.
*F16L 53/00* (2006.01)
*F28D 15/02* (2006.01)

(52) U.S. Cl.
CPC ........... *F28D 15/0233* (2013.01); *F16L 53/002* (2013.01); *F16L 53/005* (2013.01)

(58) Field of Classification Search
CPC ... F16L 53/002; F16L 53/005; F28D 15/0233
USPC ................ 165/104.21, 104.23; 122/195, 366; 122/367.1
See application file for complete search history.

(56) References Cited

U.S. PATENT DOCUMENTS

| | | | | |
|---|---|---|---|---|
| 3,952,798 A | * | 4/1976 | Jacobson | F28D 15/0233 122/366 |
| 4,017,102 A | | 4/1977 | Henderson | |
| 4,396,055 A | * | 8/1983 | Mitchell, Jr. | H02N 11/006 165/104.23 |
| 4,463,798 A | * | 8/1984 | Pogson | F28D 15/0241 165/104.23 |
| 4,947,789 A | * | 8/1990 | Hussla | C23C 16/4485 118/715 |
| 5,335,720 A | * | 8/1994 | Ogushi | F28D 15/04 122/366 |
| 5,714,738 A | | 2/1998 | Hauschulz et al. | |
| 6,230,745 B1 | * | 5/2001 | Brooks | E03B 7/14 138/33 |

(Continued)

FOREIGN PATENT DOCUMENTS

| | | |
|---|---|---|
| CN | 2239556 Y | 11/1996 |
| CN | 2268829 Y | 11/1997 |

(Continued)

OTHER PUBLICATIONS

International Search Report Issued Jan. 26, 2010 in PCT/JP09/68832 Filed Nov. 4, 2009.

(Continued)

*Primary Examiner* — Gregory A Wilson
(74) *Attorney, Agent, or Firm* — Oblon, McClelland, Maier & Neustadt, L.L.P.

(57) ABSTRACT

A heat transfer device that allows high-accuracy temperature management of an entire piping system. The heat transfer device transferring heat to the piping system through which a fluid flows includes: a high heat conductive heat transfer block surrounding the piping system; a heat pipe embedded in the heat transfer block along an extension direction of the piping system; and a heater applying heat to the heat pipe. The heat transfer block includes a plurality of divided blocks dividable along the extension direction of the piping system.

13 Claims, 20 Drawing Sheets

(56) References Cited

U.S. PATENT DOCUMENTS

| | | | | |
|---|---|---|---|---|
| 6,715,914 B1* | 4/2004 | Fesmire | ................ | G01N 25/18 374/147 |
| 2006/0231151 A1* | 10/2006 | Sasaki | .................. | F16L 53/005 138/149 |
| 2011/0194845 A1* | 8/2011 | Wang | ...................... | H05B 3/42 392/468 |
| 2012/0227934 A1* | 9/2012 | Huang | ................ | B21D 41/045 165/104.26 |

FOREIGN PATENT DOCUMENTS

| | | | |
|---|---|---|---|
| CN | 1908499 A | | 2/2007 |
| CN | 1908499 A | * | 7/2007 |
| JP | 55 126377 | | 9/1980 |
| JP | 7 224449 | | 8/1995 |
| JP | 2003 185086 | | 7/2003 |
| JP | 2003 278983 | | 10/2003 |
| JP | 2007 2986 | | 1/2007 |
| KR | 1999-0021449 U | | 6/1999 |

OTHER PUBLICATIONS

Office Action issued Feb. 12, 2014, in Korean Patent Application No. 10-2012-7009680 with English translation.

Combined Office Action and Search Report issued Jul. 2, 2013 in Chinese Patent Application No. 200980162360.9 with English language translation and English translation f categories of cited documents.

* cited by examiner

HEAT TRANSFER DEVICE

TECHNICAL FIELD

The present invention relates to a heat transfer device, and particularly to a heat transfer device equally transferring heat to a piping system.

BACKGROUND ART

Conventionally, when high-accuracy temperature management of a fluid transported through a pipe for conveying the fluid is required, the pipe is heated to control the temperature of the fluid in some cases.

As for a technique of heating the pipe, there has been conventionally proposed a pipe heating covering body including a pair of semi-cylindrical bodies formed by cutting a cylindrical body having a pipe insertion through-hole along the axis into two equal parts along the axis, a gap being formed by both cut faces facing each other, with the pipe heating covering body mounted on the pipe (refer to Japanese Patent Laying-Open No. 2007-2986 (PTL 1), for example).

There has also been conventionally proposed a covering body for a heating medium flow pipe formed of a surrounding body and a fitting body, multiple recess grooves being formed on the surface of the surrounding body surrounding the heating medium flow pipe and split into two pieces, both end portions of the fitting body of semicircular shape or the like being fitted into the recess grooves and crossing over the fitting portions split into two pieces, thereby fixing the surrounding body on the flow pipe (refer to Japanese Patent Laying-Open No. 2003-185086 (PTL 2), for example).

CITATION LIST

Patent Literature

PTL 1: Japanese Patent Laying-Open No. 2007-2986
PTL 2: Japanese Patent Laying-Open No. 2003-185086

SUMMARY OF INVENTION

Technical Problem

In the aforementioned technique, heat from a heater arranged to cover the entire outer surface of the pipe heating covering body is transferred through the covering body, thereby heating the pipe. However, since conditions for contact between the heater and the covering body vary and heat generation distribution of the heater itself occurs, the temperature distribution occurs in the pipe, thereby uniform heating of the pipe is difficult. In order to improve this temperature distribution in the pipe, the covering body must be thickened and the uniformity of the temperature on the inner surface side of the covering body must be enhanced. In this case, however, the heat capacity of the covering body increases, the energy consumption increases, and the size and the weight of the apparatus increase.

In addition, in the aforementioned technique, the amount of heat transferred from the covering body to the pipe increases by heat conduction at a portion where the covering body is in contact with the pipe. When the amount of heat transferred from the covering body to the pipe varies in the circumferential direction, the temperature distribution in the pipe is disrupted. Therefore, the conditions for contact between the covering body and the pipe must be adjusted to keep the amount of heat transferred from the covering body to the pipe as constant as possible. To this end, fine adjustments must be made at the time of attaching the covering body to surround the pipe, and ease of assembling the apparatus decreases, that is, man-hours during assembly and the cost increase.

The present invention has been made in light of the above problems and a main object thereof is to provide a heat transfer device that allows high-accuracy temperature management of an entire piping system.

Solution of Problem

A heat transfer device according to the present invention is a heat transfer device transferring heat to a piping system through which a fluid flows, including: a high heat conductive heat transfer block surrounding the piping system; a heat pipe formed in the heat transfer block along an extension direction of the piping system; and a heating unit applying heat to the heat pipe. The heat transfer block includes a plurality of divided blocks dividable along the extension direction of the piping system.

Preferably, in the above heat transfer device, the piping system includes a first pipe, a second pipe, and a coupling unit coupling one end of the first pipe and one end of the second pipe, and the heat pipe extends from the other end of the first pipe to the other end of the second pipe.

Preferably, in the above heat transfer device, the coupling unit is larger in outer diameter than the first pipe and the second pipe, and a tubular space extending along the extension direction of the piping system is formed at a portion closer to the piping system than the heat pipe in the heat transfer block.

Preferably, in the above heat transfer device, the piping system includes a first pipe, a second pipe, and a coupling unit coupling one end of the first pipe and one end of the second pipe, the coupling unit is larger in outer diameter than the first pipe and the second pipe, and the heat pipe includes a first channel embedded along the first pipe and a second channel embedded along the second pipe.

Preferably, in the above heat transfer device, the heating unit is in thermal contact with the heat transfer block surrounding the coupling unit.

Preferably, in the above heat transfer device, the heating unit includes a first heat source heating an end of the first channel on a side close to the coupling unit, and a second heat source heating an end of the second channel on a side close to the coupling unit.

Preferably, in the above heat transfer device, the heat transfer block includes a first block having the first channel embedded therein, a second block having the second channel embedded therein, and a coupling block surrounding the coupling unit. The heating unit is in thermal contact with the coupling block.

Preferably, in the above heat transfer device, the heat pipe includes a third channel embedded in the coupling block.

Preferably, in the above heat transfer device, the heat pipe is embedded in only one of the divided blocks.

Preferably, in the above heat transfer device, the heat transfer block has a polygonal outer shape in a cross section orthogonal to the extension direction of the piping system.

Preferably, in the above heat transfer device, the heat pipe includes a hollow portion formed within the heat transfer block and evacuated, and a working fluid retained in the hollow portion.

Preferably, in the above heat transfer device, a groove portion is formed in an outer circumferential surface of the heat transfer block, and the heat pipe includes a pipe member embedded in the groove portion and evacuated, and a working fluid retained in the pipe member.

Preferably, the above heat transfer device further includes equipment coupled to an end of the piping system, and the heat transfer block surrounds the equipment.

Advantageous Effects of Invention

According to the heat transfer device of the present invention, heat can be equally transferred to the piping system and high-accuracy temperature management of the entire piping system is possible.

DESCRIPTION OF EMBODIMENTS

Figure 1:
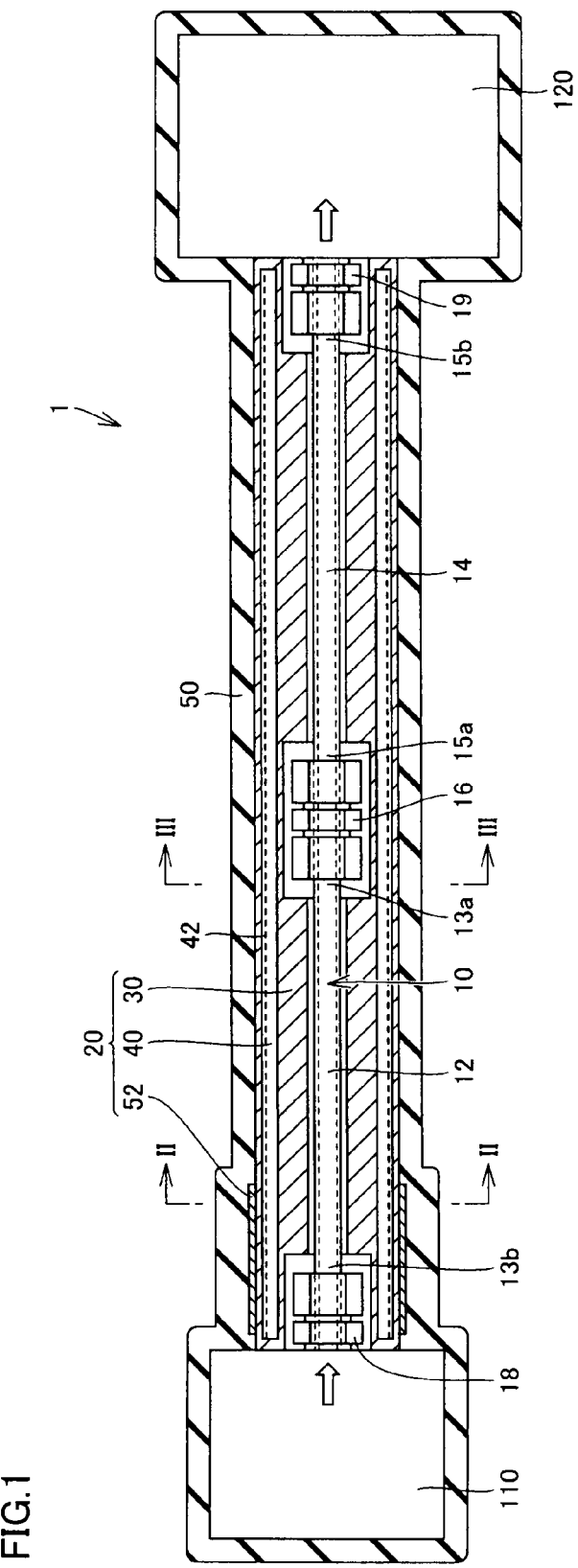
FIG. 1 is a schematic view showing a configuration of a heat transfer device according to a first embodiment.

Embodiments of the present invention will be described hereinafter with reference to the drawings, in which the same or corresponding portions are denoted with the same reference numerals and a description thereof will not be repeated.

First Embodiment

Figure 2:
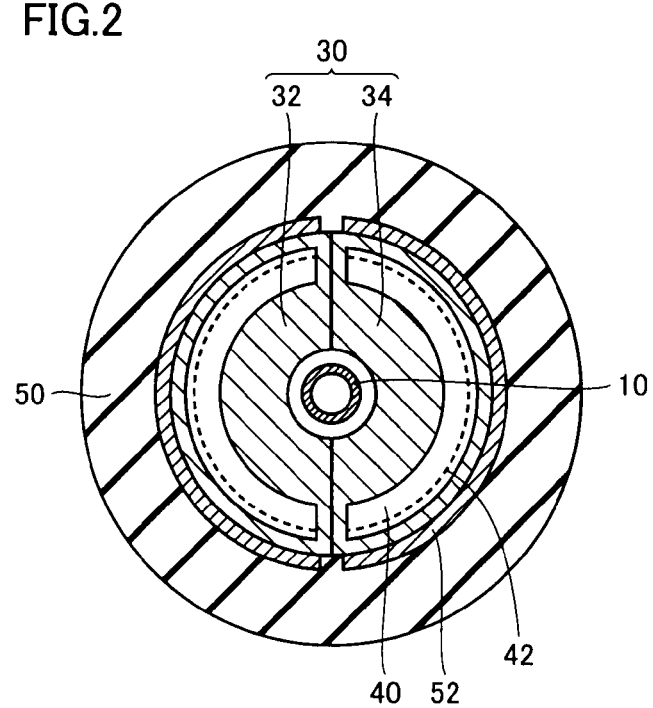
FIG. 2 is a cross-sectional view of the heat transfer device taken along line II-II in FIG. 1.
Figure 3:
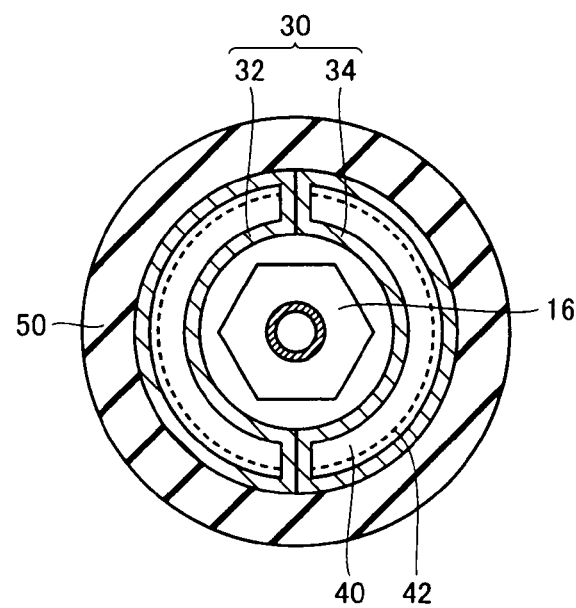
FIG. 3 is a cross-sectional view of the heat transfer device taken along line in FIG. 1.

FIG. 1 is a schematic view showing a configuration of a heat transfer device according to a first embodiment. FIG. 2 is a cross-sectional view of the heat transfer device taken along line II-II in FIG. 1. FIG. 3 is a cross-sectional view of the heat transfer device taken along line III-III in FIG. 1. FIG. 1 shows a partially cut plan view of a fluid conveying apparatus 1 using the heat transfer device according to the present embodiment.

As shown in FIG. 1, fluid conveying apparatus 1 includes two equipment 110 and 120, and a piping system 10 connecting equipment 110 and 120. Fluid conveying apparatus 1 is an apparatus for causing a fluid to flow from one equipment 110 through piping system 10 to the other equipment 120 as indicated by a hollow arrow in FIG. 1. Piping system 10 includes a first pipe 12 and a second pipe 14. First pipe 12 has one end 13a and the other end 13b. Second pipe 14 has one end 15a and the other end 15b. In addition, piping system 10 includes a coupling unit 16 coupling one end 13a of first pipe 12 and one end 15a of second pipe 14, a coupling unit 18 coupling equipment 110 and the other end 13b of first pipe 12, and a coupling unit 19 coupling the other end 15b of second pipe 14 and equipment 120.

Fluid conveying apparatus 1 includes a heat transfer device 20. Heat transfer device 20 equally transfers heat to piping system 10 and uniformly heats, through piping system 10, a fluid flowing through piping system 10. Heat transfer device 20 includes a heat transfer block 30 surrounding piping system 10, a heat pipe 40 formed in heat transfer block 30 along an extension direction of piping system 10, and a heater 52 as one example of a heating unit applying heat to heat pipe 40.

Piping system 10 herein is based on a concept of including a pipe through which a fluid flows and a pipe attachment connected to the pipe, and refers to a mutually-coupled pipe assembly including the pipe attachment. The pipe is not limited to a straight pipe and includes a bent pipe bent to have an arbitrary shape. In addition, the pipe is not limited to a non-flexible pipe and may include a flexible pipe such as, for example, a flexible tube. The pipe attachment includes, for example, a joint as typified by an elbow, a T-joint and the like, a valve, a strainer, a nozzle and the like. Piping system 10 may also include equipment connected in communication with the pipe, such as a tank storing the fluid, a vaporizer heating and vaporizing the fluid, and a reaction chamber supplied with a gaseous material to produce predetermined reaction such as film formation on a surface of a substrate.

Heat transfer block 30 covering piping system 10 is made of a high heat conductive material as typified by a metal material such as, for example, aluminum or copper. If heat transfer block 30 is made of aluminum, reduction in the weight of heat transfer block 30 can be achieved, and the heat transfer efficiency by radiation can be enhanced by anodizing a surface of heat transfer block 30 facing piping system 10. Therefore, heat transfer block 30 made of aluminum is desirable. If heat transfer block 30 is made of copper, higher heat conductivity can be achieved and water excellent in the thermal property can be used as a working fluid in heat pipe 40. Therefore, heat transfer block 30 made of copper is desirable.

Heat pipe 40 is a conventional wick-type heat pipe and includes a hollow portion formed within heat transfer block 30. This hollow portion is formed as an enclosed space and as an evacuated and decompressed vacuum space. A wick 42 having capillary force and made of a porous material is provided on an inner surface of the hollow portion. As wick 42, a metal mesh or a sintered metal may be attached to the inner surface of the hollow portion, or a small groove may be formed in the inner surface.

Heat pipe 40 also includes the working fluid retained in the hollow portion. The working fluid has a property of evaporating as a result of heating and condensing as a result of releasing heat (condensation property). An appropriate amount of this condensable working fluid is injected into the hollow portion, which is an evacuated and decompressed enclosed space, and thereby heat pipe 40 can be formed. In heat pipe 40, the working fluid heated and vaporized at a high temperature portion where heater 52 is arranged moves within the hollow portion, condenses and releases latent heat on a wall surface at a low temperature portion having a relatively low temperature in the hollow portion, thereby equally heating the hollow portion. The condensed working fluid circulates to the high temperature portion by the capillary action of wick 42. By repeating the above, heat is transported from the high temperature portion to the low temperature portion.

It is to be noted that heat pipe 40 is not limited to the above-mentioned wick-type heat pipe. Heat pipe 40 may be a thermo siphon-type heat pipe using gravity, or a loop-type heat pipe in which a two-phase condensable working fluid is injected into a looped narrow tube.

Heat pipe 40 extends from the other end 13b of first pipe 12 to the other end 15b of second pipe 14. As shown in FIG. 1, heat pipe 40 is formed within heat transfer block 30 along the extension direction of piping system 10 from heat transfer block 30 surrounding coupling unit 18 connected to the other end 13b of first pipe 12 to heat transfer block 30 surrounding coupling unit 19 connected to the other end 15b of second pipe 14. Heat pipe 40 surrounds the entire extension direction of first pipe 12, second pipe 14 and coupling unit 16.

An arbitrary heat source can be used as heater 52 heating heat pipe 40 and evaporating the working fluid. Typically, for example, an electric heater, a heating medium circulating-type heater, an induction heating-type heater or the like is applicable.

Heater 52 is in thermal contact with heat transfer block 30 to heat heat pipe 40 on the side close to equipment 110. As shown in FIGS. 1 and 2, heater 52 is in contact with an outer circumferential surface of cylindrical heat transfer block 30. Heater 52 may only be in thermal contact with heat transfer block 30 to transfer heat through heat transfer block 30 to heat pipe 40. In addition to such a configuration that heater 52 is in contact with an outer surface of heat transfer block 30 as shown in FIGS. 1 and 2, heater 52 may be embedded in heat transfer block 30. If heater 52 can heat any one location of heat pipe 40, entire heat pipe 40 can be uniformly heated. Therefore, arrangement of heater 52 is not limited to the position shown in FIG. 1.

"Thermal contact" herein refers to the state with sufficiently high heat transfer efficiency in which heat is directly transferred between heat transfer block 30 and heater 52. "Thermal contact" is not limited to the case where these members abut each other and are in direct mechanical contact with each other. The thermal contact state includes, for example, the case where heater 52 and heat transfer block 30 are integrated by brazing, welding and the like, or the case where heater 52 is in indirect contact with heat transfer block 30 with a high heat conductive substance interposed therebetween.

The entire apparatus extending from equipment 110 through first pipe 12 and second pipe 14 to equipment 120 is externally covered with an heat insulator 50. Heat insulator 50 suppresses heat transfer between fluid conveying apparatus 1 and the outside. Therefore, reliquefaction of the vaporized fluid flowing through piping system 10 can be suppressed and energy loss can be reduced. Heat insulator 50 may be made of any material as long as heat insulator 50 is made of a low heat conductive material serving as a barrier for suppressing heat conduction. Heat insulator 50 is made of a material having a lot of gaseous small foam in a solid, such as, for example, glass wool and polystyrene foam.

As shown in FIGS. 2 and 3, heat transfer block 30 includes a plurality of divided blocks 32 and 34. Piping system 10 is covered with divided-type heat transfer block 30. In the present embodiment, divided blocks 32 and 34 are each formed to have a semi-cylindrical shape that is dividable along the extension direction of piping system 10 (i.e., the horizontal direction in FIG. 1 and the direction perpendicular to the sheet in FIGS. 2 and 3). Combined divided blocks 32 and 34 constitute hollow and cylindrical heat transfer block 30 having a tubular hollow space therein. The hollow portion is formed within divided blocks 32 and 34, and heat pipe 40 is provided in divided blocks 32 and 34.

The shape of the divided blocks constituting heat transfer block 30 is not limited to the semi-cylindrical shape shown in FIGS. 2 and 3, and the number of the divided blocks is not limited to two, either. The arbitrary number of divided blocks each having an arbitrary shape may constitute heat transfer block 30. If a combination of divided blocks having the same shapes constitutes heat transfer block 30, the productivity of heat transfer block 30 can be enhanced. Therefore, such heat transfer block 30 is desirable.

According to heat transfer device 20 as described above, piping system 10 is covered with heat transfer block 30, heat pipe 40 is provided in the hollow portion formed within this heat transfer block 30, and heat is transferred through heat transfer block 30 to piping system 10. With such a configuration, heat transfer block 30 is automatically heated to an equal temperature due to the heat transport function of heat pipe 40, and thus, the uniformity of the amount of heat transferred to piping system 10 can be enhanced.

In a conventional configuration in which a heater is in contact with an outer surface of a heat transfer block to heat a piping system, the temperature distribution occurs in a pipe due to varying the conditions for contact between the heater and the heat transfer block and heat generation distribution of the heater itself. Therefore, control for heating the piping system to an equal temperature is difficult. In contrast, in heat transfer device 20 according to the present embodiment, heat pipe 40 is formed in heat transfer block 30, and thus, the heat equalizing property can be ensured throughout heat transfer block 30. Therefore, there can be provided heat transfer device 20 that allows equal transfer of heat to piping system 10 and high-accuracy temperature management of the entire piping system.

Since heat pipe 40 is formed in a hollow channel provided within heat transfer block 30, heater 52 heating heat transfer block 30 may heat only a part of heat transfer block 30. In other words, heater 52 may be arranged at only a part of heat transfer block 30. Therefore, reduction in the size of heater 52, making heater 52 compact, and reduction in the price of heater 52 can be achieved. In addition, the amount of energy consumed by heater 52 can be reduced, and thus, the running cost of heat transfer device 20 can be reduced.

Since the heat equalizing property of heat transfer block 30 is implemented by the function of heat pipe 40, it is not necessary to thicken heat transfer block 30 to improve the temperature distribution in heat transfer block 30. Heat transfer block 30 may only have a minimum thickness that allows ensuring of strength with respect to the internal pressure of the working fluid in heat pipe 40, and thus, reduction in the size of heat transfer block 30 can be achieved. Therefore, the heat capacity of heat transfer block 30 can be reduced, and thus, the capacity of heater 52 when the temperature rises can be reduced and the energy consumption can be reduced. In addition, reduction in the weight of heat transfer block 30 can be achieved.

With reduction in the size of heat transfer block 30, the circumferential length of heat insulator 50 covering the outer circumference of heat transfer block 30 can be shortened and the area of the outer surface of heat insulator 50 can be decreased. The amount of heat released from the surface of heat insulator 50 to the surroundings is proportional to the surface area of heat insulator 50, and input of heater 52 in a steady state of heat transfer device 20 corresponds to the amount of heat released from heat insulator 50 to the surroundings. Therefore, by shortening the cross-sectional circumferential length of heat insulator 50 and decreasing the surface area of heat insulator 50, the input of heater 52 can be reduced, and thus, the energy consumption can be further reduced.

In the conventional technique, fine adjustments must be made during assembly to adjust the conditions for contact between the pipe and the covering body provided to surround the pipe. In contrast, in heat transfer device 20 according to the present embodiment, the surface temperature of heat transfer block 30 can be made uniform automatically by heat pipe 40 and entire heat transfer block 30 having an uniform temperature surface covers piping system 10. Therefore, the conditions for contact between heat transfer block 30 and piping system 10 do not have a great influence on the temperature distribution in piping system 10. Therefore, adjustments of the conditions for contact between heat transfer block 30 and piping system 10 is unnecessary. Thus, ease of assembling the apparatus can be enhanced, and reduction in the man-hours during assembly and the cost can be achieved.

A gap is formed between the inner circumferential surface of cylindrical heat transfer block 30 and the outer surface of piping system 10 surrounded by heat transfer block 30 as shown in FIGS. 1 to 3. As shown in FIG. 2, a portion of heat transfer block 30 covering first pipe 12 is provided to have a larger inner diameter by a predetermined dimension than the outer diameter of first pipe 12. As shown in FIG. 3, a portion of heat transfer block 30 covering coupling unit 16 is provided to have a larger inner diameter by a predetermined dimension than the outer diameter of coupling unit 16.

Since the gap is formed as described above, errors occurring during mounting piping system 10 can be tolerated, and thus, ease of mounting piping system 10 can be enhanced. As described above, the conditions for contact between heat transfer block 30 and piping system 10 do not have a great influence on the temperature distribution in piping system 10, and whether the gap is present or not between heat transfer block 30 and piping system 10 does not have a great influence on the temperature distribution in piping system 10.

As shown in FIGS. 2 and 3, piping system 10 is heated with piping system 10 covered with the plurality of divided blocks 32 and 34. Heat pipe 40 is embedded in divided blocks 32 and 34. Since such a structure of divided-type heat transfer block 30 is used, attaching and removing heat pipe 40 to/from piping system 10 become easier, and thus, maintenance of piping system 10 becomes easier.

In addition, if existing piping system 10 is covered with divided-type heat transfer block 30, heat transfer device 20 capable of equally heating existing piping system 10 can be additionally provided with ease.

Second Embodiment

Figure 4:
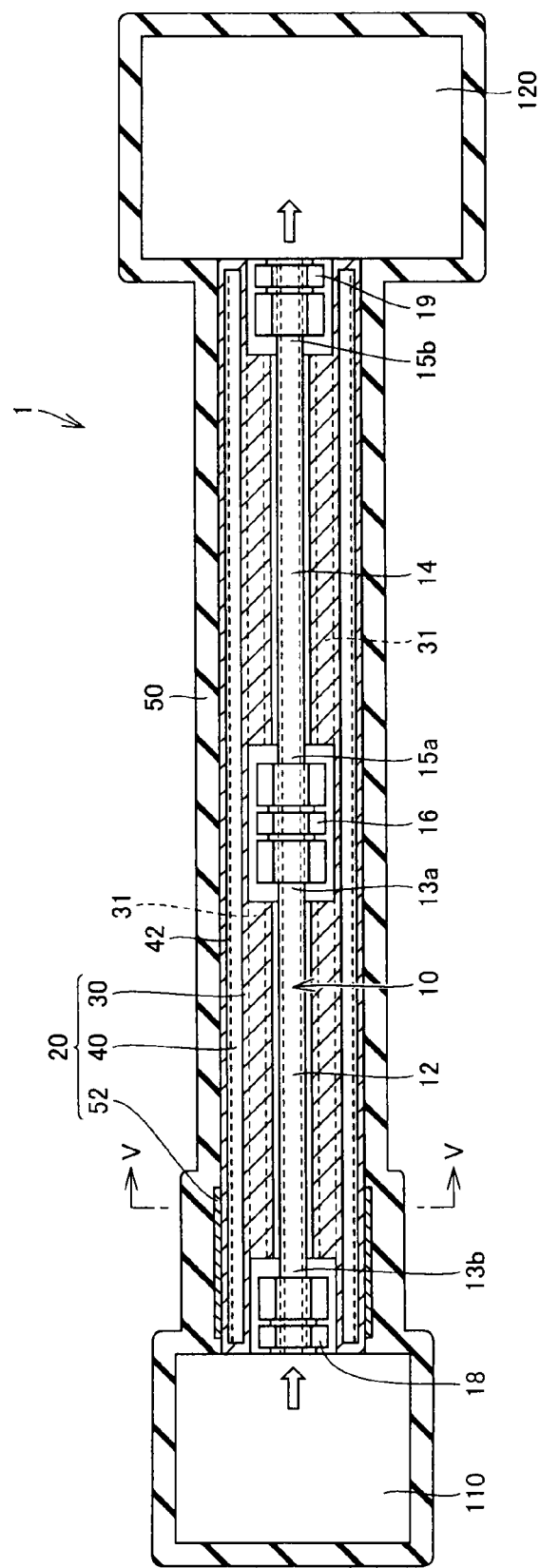
FIG. 4 is a schematic view showing a configuration of a heat transfer device according to a second embodiment.
Figure 5:
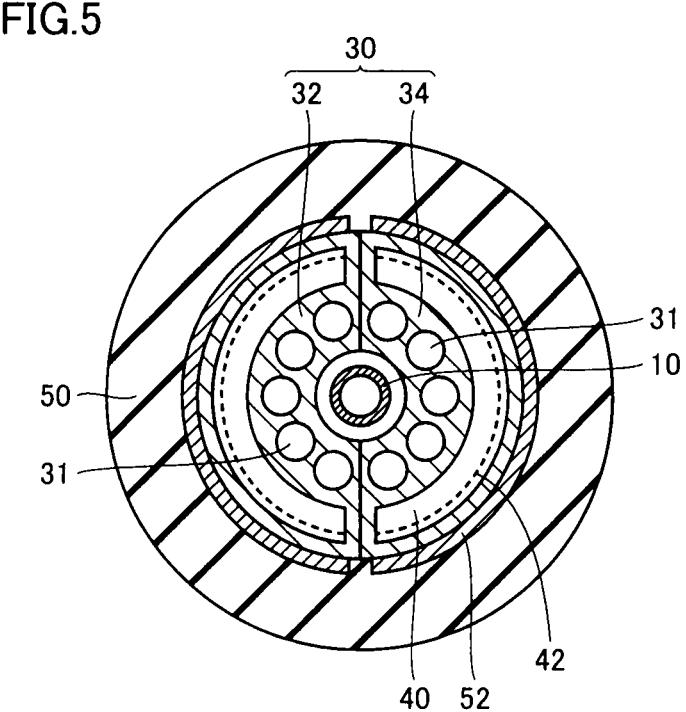
FIG. 5 is a cross-sectional view of the heat transfer device taken along line V-V in FIG. 4.

FIG. 4 is a schematic view showing a configuration of a heat transfer device according to a second embodiment. FIG. 5 is a cross-sectional view of the heat transfer device taken along line V-V in FIG. 4. As shown in FIGS. 4 and 5, heat transfer device 20 according to the second embodiment is different from heat transfer device 20 according to the first embodiment in that a plurality of tubular spaces 31 extending along the extension direction of piping system 10 are formed on the inner diameter side of heat transfer block 30, which is a portion closer to piping system 10 than heat pipe 40.

In the first and second embodiments, coupling unit 16 coupling first pipe 12 and second pipe 14 such as a linear joint, an elbow and the like is larger in diameter than first pipe 12 and second pipe 14. Therefore, when heat pipe 40 is configured to include the hollow portion extending to both ends of heat transfer block 30, a thick portion is present on the inner diameter side of heat transfer block 30 surrounding first pipe 12 and second pipe 14 (refer to FIGS. 1 and 2). The presence of this thick portion leads to an increase in the weight of heat transfer block 30 and an increase in the heat capacity of heat transfer block 30.

Thus, in heat transfer block 30 in the second embodiment, tubular spaces 31 extending in the extension direction of heat transfer block 30 are formed on the inner diameter side of heat transfer block 30. Since the inner diameter portion of heat transfer block 30 is subjected to drilling processing as described above, reduction in the weight of heat transfer block 30 and reduction in the heat capacity of heat transfer block 30 can be achieved.

Third Embodiment

Figure 6:
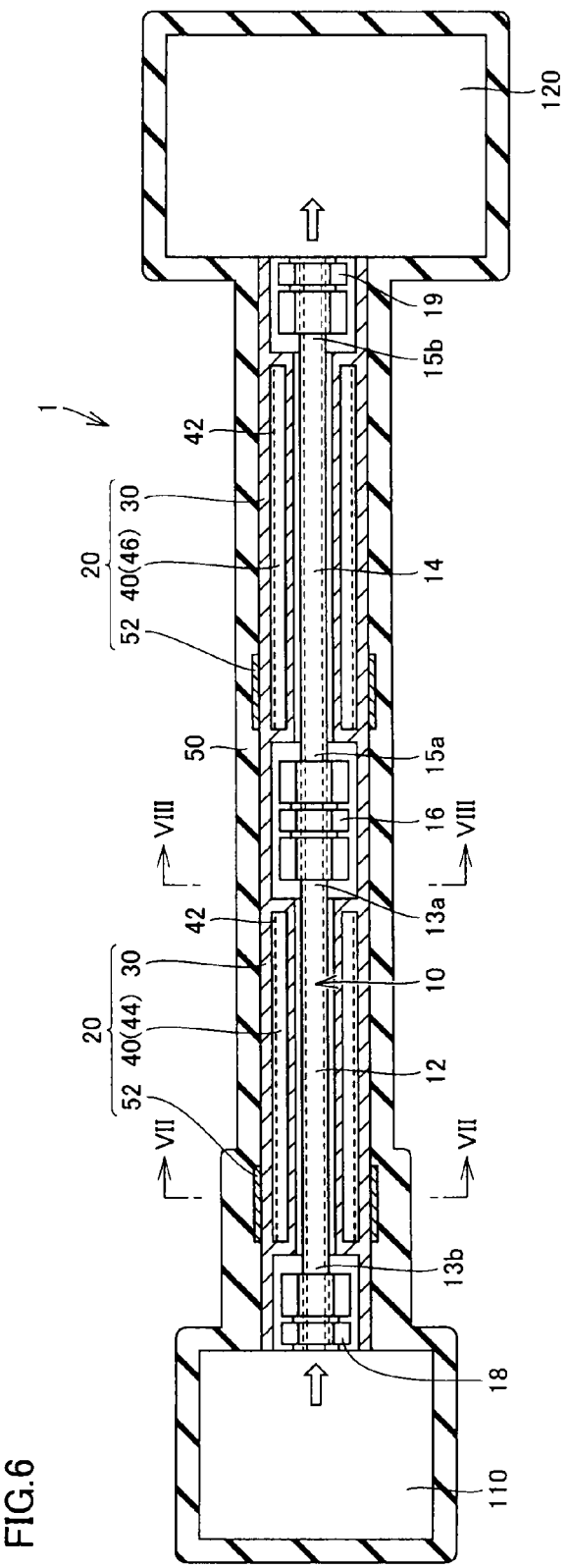
FIG. 6 is a schematic view showing a configuration of a heat transfer device according to a third embodiment.
Figure 7:
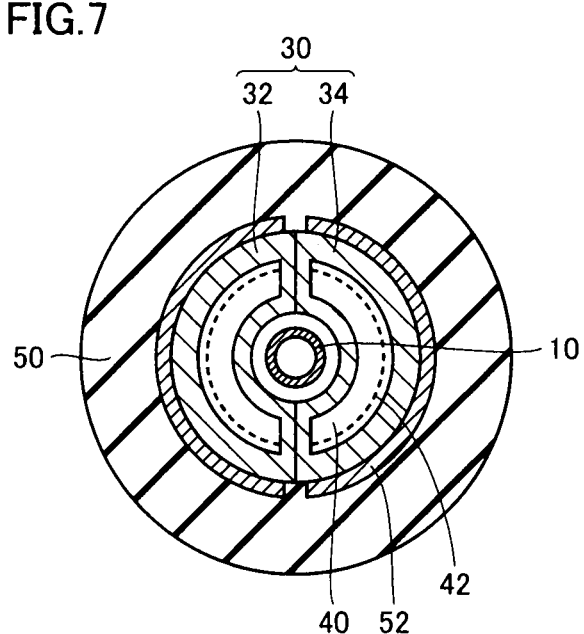
FIG. 7 is a cross-sectional view of the heat transfer device taken along line VII-VII in FIG. 6.
Figure 8:
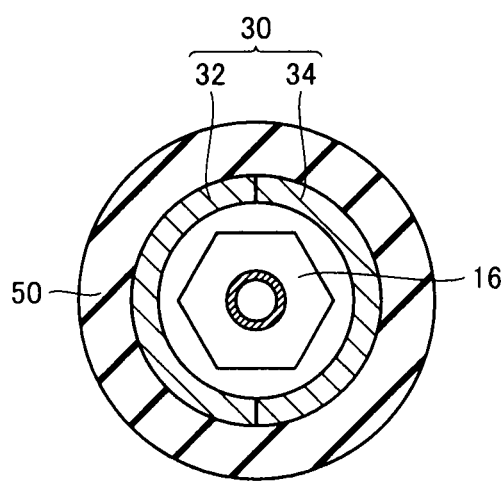
FIG. 8 is a cross-sectional view of the heat transfer device taken along line VIII-VIII in FIG. 6.

FIG. 6 is a schematic view showing a configuration of a heat transfer device according to a third embodiment. FIG. 7 is a cross-sectional view of the heat transfer device taken along line VII-VII in FIG. 6. FIG. 8 is a cross-sectional view of the heat transfer device taken along line VIII-VIII in FIG. 6. As in the first embodiment, piping system 10 in the third embodiment includes first pipe 12, second pipe 14, and coupling unit 16 coupling one end 13a of first pipe 12 and one end 15a of second pipe 14. Coupling unit 16 is larger in outer diameter than first pipe 12 and second pipe 14.

As shown in FIG. 6, heat pipe 40 includes a first channel 44 embedded along first pipe 12 and a second channel 46 embedded along second pipe 14. Heat transfer device 20 provided around first pipe 12 is configured to include heat transfer block 30 surrounding first pipe 12, first channel 44, and heater 52 transferring heat to first channel 44. Heat transfer device 20 provided around second pipe 14 is configured to include heat transfer block 30 surrounding second pipe 14, second channel 46, and heater 52 transferring heat to second channel 46.

A joint, an elbow, a T-joint and the like are, for example, used as coupling unit 16 coupling first pipe 12 and second pipe 14. Coupling unit 16 is larger in diameter than first pipe 12 and second pipe 14. Therefore, when heat pipe 40 is provided in heat transfer block 30 surrounding the coupling unit, heat transfer block 30 must have a diameter that allows embedding of heat pipe 40, which leads to an increase in the size of heat transfer block 30.

Thus, in the third embodiment, heat pipe 40 is divided into first channel 44 and second channel 46, and coupling unit 16 is covered only with heat transfer block 30. With such a configuration, heat pipe 40 can be embedded at a position close to first pipe 12 and second pipe 14 on the inner diameter side of heat transfer block 30, and the outer diameter of heat transfer block 30 can be reduced, as compared with the first embodiment. Therefore, reduction in the size of heat transfer block 30 can be achieved, and thus, effects such as reduction in the weight and the heat capacity of heat transfer block 30 can be obtained more significantly.

In the configuration according to the third embodiment, heat pipe 40 is not arranged around coupling unit 16. By heat conduction from heat transfer block 30 heated by first channel 44 and second channel 46, heat transfer block 30 surrounding coupling unit 16 is heated, and thereby heat is transferred to coupling unit 16. If heat transfer block 30 is made of a high heat conductive material such as aluminum and copper and a distance between heat pipe 40 (i.e., first channel 44 and second channel 46) and coupling unit 16 is small, the temperature distribution in entire piping system 10 can be made sufficiently small and entire piping system 10 can be equally heated even when heat is transferred to coupling unit 16 only by heat conduction. For example, if a distance between one end 13a of first pipe 12 and one end 15a of second pipe 14 is approximately 50 mm or shorter, heat can be transferred excellently from first channel 44 and second channel 46 through heat transfer block 30 to coupling unit 16 by using heat insulator 50 to provide sufficient heat insulation to the outer circumferential surface of heat transfer block 30.

Fourth Embodiment

Figure 9:
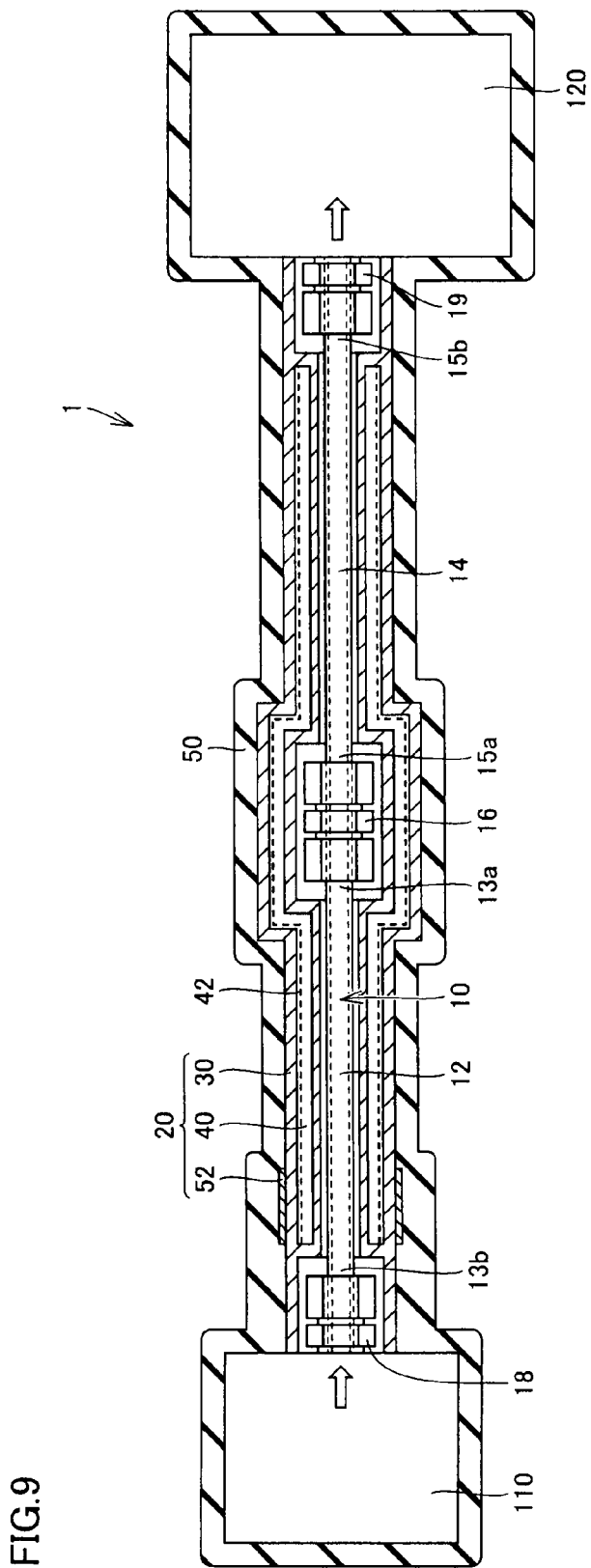
FIG. 9 is a schematic view showing a configuration of a heat transfer device according to a fourth embodiment.

FIG. 9 is a schematic view showing a configuration of a heat transfer device according to a fourth embodiment. In the fourth embodiment, heat pipe 40 is arranged to surround first pipe 12, second pipe 14 and coupling unit 16 as in the first embodiment. Heat pipe 40 is formed in such a manner that a radial dimension thereof changes to cross over coupling unit 16. Heater 52 is provided at one location to be in contact with the outer circumferential surface of heat transfer block 30. In this example, heater 52 heats an end of heat pipe 40 on the side close to equipment 110.

Coupling unit 16 is larger in outer diameter than first pipe 12 and second pipe 14. The outer diameter of heat transfer block 30 is adjusted such that heat pipe 40 can be embedded in heat transfer block 30. Heat transfer block 30 surrounding first pipe 12 and heat transfer block 30 surrounding second pipe 14 are smaller in outer diameter than heat transfer block 30 surrounding coupling unit 16. The outer diameter of heat transfer block 30 changes in the extension direction thereof. Heat transfer block 30 is formed such that the portion surrounding coupling unit 16 has a maximum outer diameter and the portion surrounding first pipe 12 and second pipe 14 has a relatively smaller outer diameter.

With such a configuration, heat transfer block 30 surrounding first pipe 12 and second pipe 14 can be formed to have a small diameter, as compared with the first embodiment. Therefore, reduction in the weight and the heat capacity of heat transfer block 30 can be achieved.

In addition, since piping system 10 extending from first pipe 12 to second pipe 14 is covered with heat pipe 40 having one channel, heater 52 heating heat pipe 40 may be provided at one location. Since heat pipe 40 in the present embodiment has a curved or bent portion, the heat transfer performance may decline as compared with the heat pipes in the first to third embodiments. However, if heat pipe 40 is provided such that sufficient heat transfer performance can be achieved and heat can be equally transferred to entire heat transfer block 30, the configuration according to the present embodiment is advantageous in terms of reduction in the size of heat transfer block 30 and reduction in the number of heater 52.

Piping system 10 is surrounded by one heat pipe 40. Therefore, if heater 52 can heat any one location of heat pipe 40, entire heat pipe 40 can be uniformly heated. Therefore, as described in the first embodiment, heater 52 can be arbitrarily arranged. Specifically, heater 52 may be in contact with the outer surface of heat transfer block 30 at an arbitrary position, or may be embedded in heat transfer block 30 at an arbitrary position.

Fifth Embodiment

Figure 10:
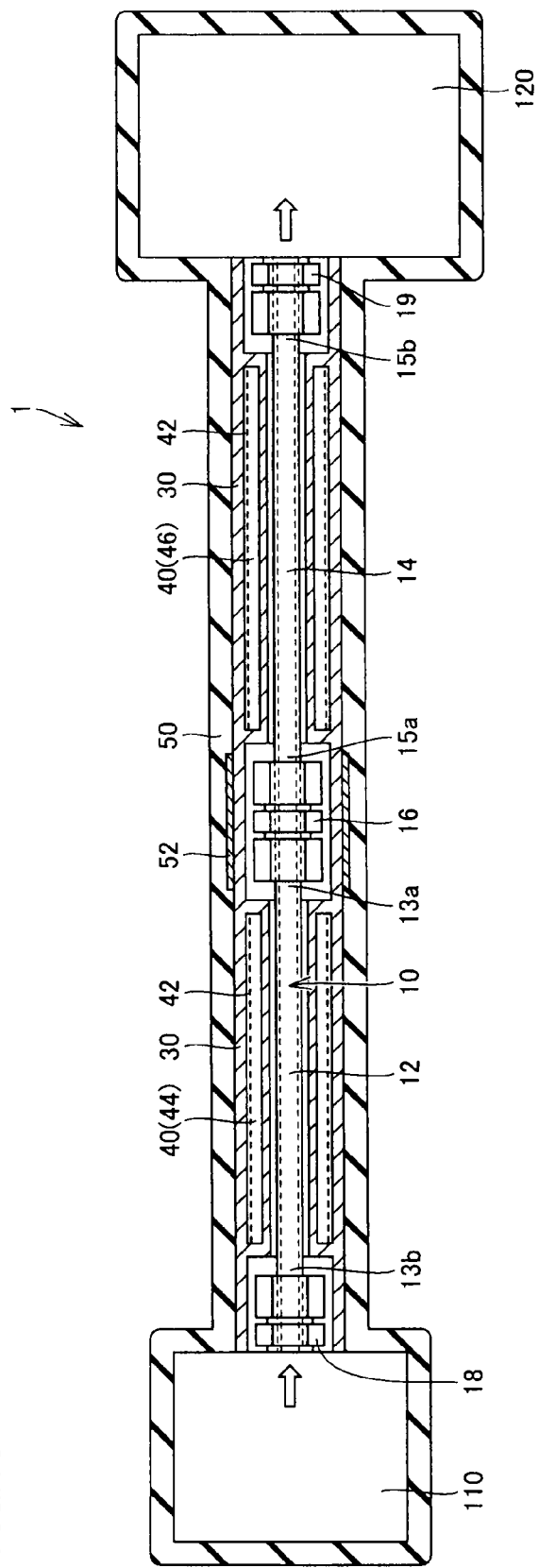
FIG. 10 is a schematic view showing a configuration of a heat transfer device according to a fifth embodiment.

FIG. 10 is a schematic view showing a configuration of a heat transfer device according to a fifth embodiment. Heat transfer device 20 according to the fifth embodiment is similar to heat transfer device 20 according to the third embodiment in that heat pipe 40 includes first channel 44 and second channel 46, and is different in that heater 52 applying heat to both first channel 44 and second channel 46 is arranged at one location. In the present embodiment, heater 52 as one example of the heating unit is in thermal contact with heat transfer block 30 surrounding coupling unit 16. Heat generated by heater 52 is transferred through heat transfer block 30 to an end of first channel 44 on the side close to coupling unit 16 and an end of second channel 46 on the side close to coupling unit 16 by heat conduction. This heat heats the working fluid in first channel 44 and second channel 46.

With such a configuration, heater 52 at one location can heat both first channel 44 and second channel 46, and thus, the number of heater 52 can be reduced as compared with heat transfer device 20 according to the third embodiment. Therefore, the device cost and the operation cost of heat transfer device 20 can be reduced. In addition, if heat transfer device 20 is formed such that heat is equally transferred from heater 52 at one location to both first channel 44 and second channel 46, control over a plurality of heaters 52 for temperature control over piping system 10 becomes unnecessary and entire piping system 10 can be easily maintained at more equal temperature.

Sixth Embodiment

Figure 11:
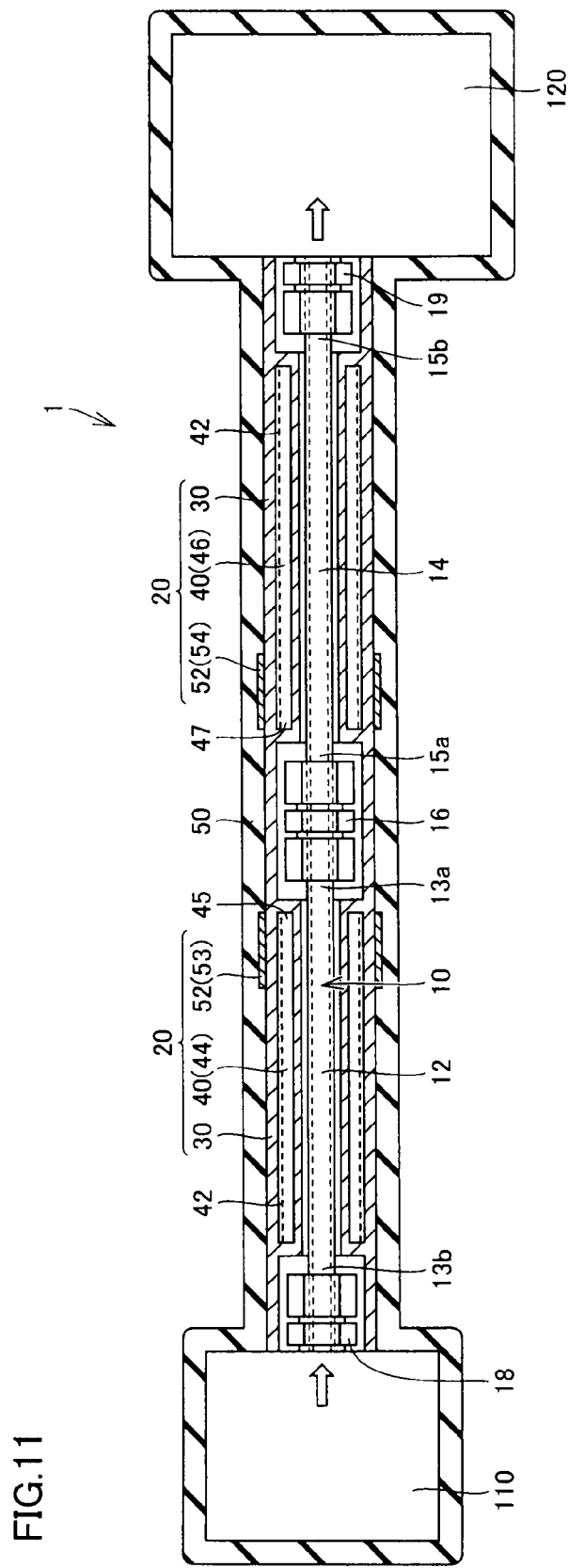
FIG. 11 is a schematic view showing a configuration of a heat transfer device according to a sixth embodiment.

FIG. 11 is a schematic view showing a configuration of a heat transfer device according to a sixth embodiment. In heat transfer device 20 according to the sixth embodiment, heat pipe 40 includes first channel 44 and second channel 46, and heater 52 serving as the heating unit includes a first heat source 53 heating an end 45 of first channel 44 on the side close to coupling unit 16 and a second heat source 54 heating an end 47 of second channel 46 on the side close to coupling unit 16.

Such a structure that heater 52 is in contact with heat transfer block 30 surrounding coupling unit 16 is not preferable in some cases, such as the case where coupling unit 16 coupling first pipe 12 and second pipe 14 includes a valve. In this case, as in the present embodiment, first heat source 53 heating first channel 44 and second heat source 54 heating second channel 46 may be separately placed and coupling unit 16 may be heated as a result of transfer of heat generated by first heat source 53 and second heat source 54 through heat transfer block 30 by heat conduction.

With such a configuration, heat transfer block 30 surrounding coupling unit 16 can be heated and heat can be transferred to coupling unit 16 by heat conduction. Since heat transfer device 20 is formed such that heat is equally transferred from both first heat source 53 and second heat source 54 to heat transfer block 30 surrounding coupling unit 16, contact of heater 52 with heat transfer block 30 surrounding coupling unit 16 can be avoided and entire piping system 10 can be equally heated with great accuracy.

Seventh Embodiment

Figure 12:
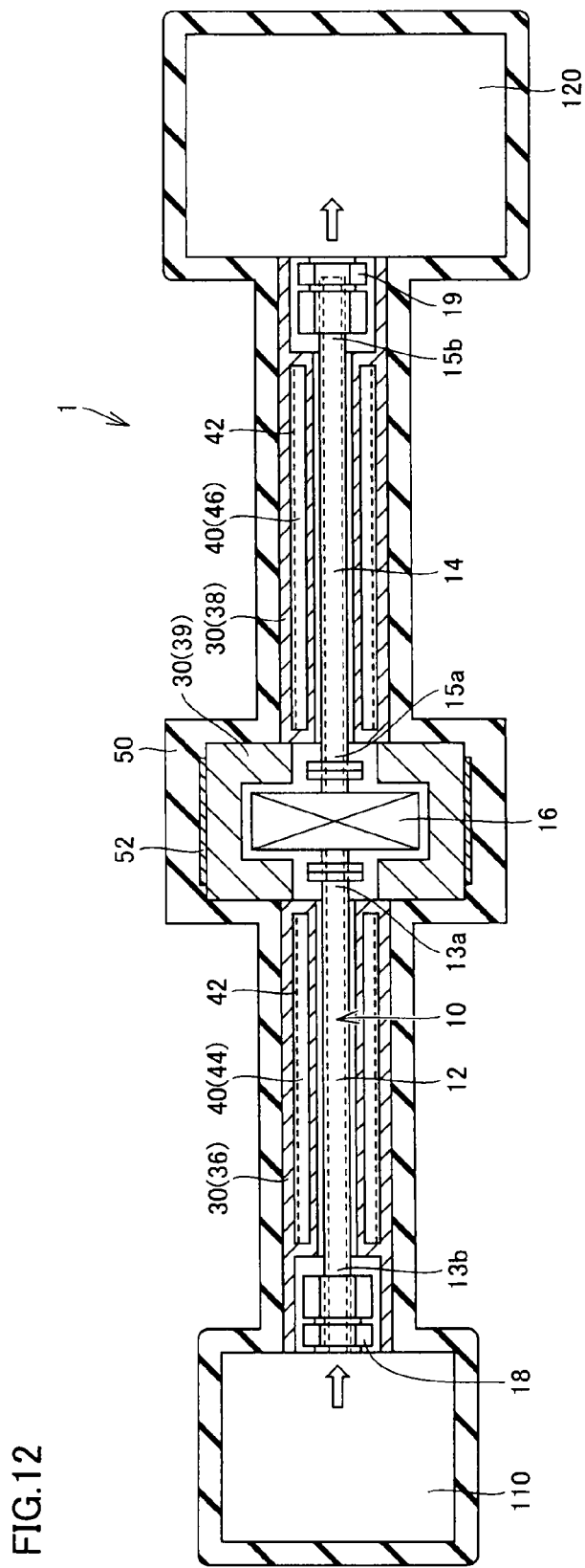
FIG. 12 is a schematic view showing a configuration of a heat transfer device according to a seventh embodiment.

FIG. 12 is a schematic view showing a configuration of a heat transfer device according to a seventh embodiment. As compared with the first to sixth embodiments, coupling unit 16 in the seventh embodiment has a much larger outer diameter than those of first pipe 12 and second pipe 14. As shown in FIG. 12, coupling unit 16 is formed to have a larger outer diameter than that of heat pipe 40 (first channel 44 and second channel 46) arranged around first pipe 12 and second pipe 14.

Heat transfer block 30 is divided into a plurality of blocks. Specifically, heat transfer block 30 includes a first block 36 having first channel 44 embedded therein, a second block 38 having second channel 46 embedded therein, and a coupling block 39 surrounding coupling unit 16. First block 36 is in contact with coupling block 39, and second block 38 is in contact with coupling block 39. Coupling block 39 has a larger outer diameter than those of first block 36 and second block 38.

Heater 52 serving as the heating unit is in thermal contact with coupling block 39. Heater 52 is in contact with an outer circumferential surface of coupling block 39 to transfer heat to coupling block 39. Coupling block 39 heated by heater 52 heats coupling unit 16. In addition, heat is transferred from coupling block 39 to first block 36 and second block 38. As a result, heat is transferred to first channel 44 and second channel 46, and the working fluid in first channel 44 and second channel 46 is heated.

Since coupling block 39 surrounding large-diameter coupling unit 16 is formed separately from first block 36 and second block 38 surrounding first pipe 12 and second pipe 14 as described above, reduction in the overall size of heat transfer block 30 can be achieved. In addition, since heat transfer block 30 is divided into the plurality of blocks, removal of heat transfer block 30 becomes much easier and maintenance of piping system 10 or heat pipe 40 becomes much easier.

Figure 13:
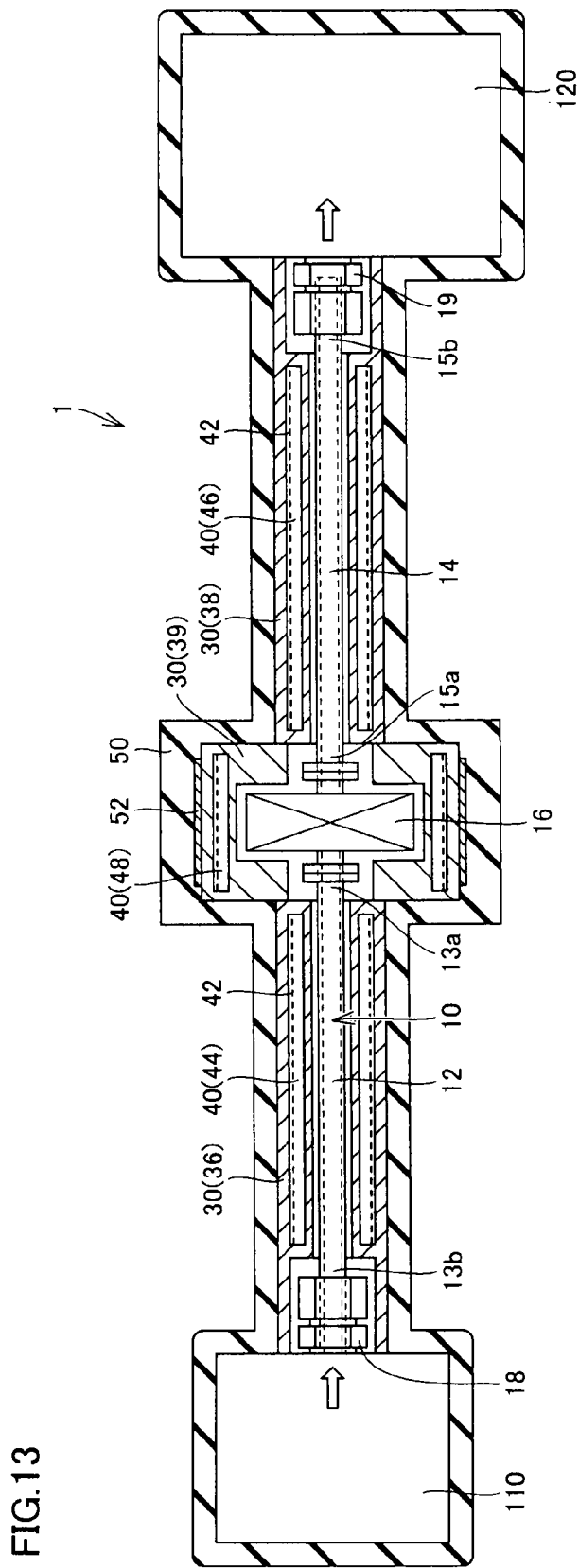
FIG. 13 is a schematic view showing another example of the configuration of the heat transfer device according to the seventh embodiment.

FIG. 13 is a schematic view showing another example of the configuration of the heat transfer device according to the seventh embodiment. In heat transfer device 20 shown in FIG. 13, heat pipe 40 includes a third channel 48 embedded in coupling block 39. With such a configuration, heat in coupling block 39 can be further equalized by the heat equalizing function of third channel 48, and thus, there can be provided heat transfer device 20 transferring heat to entire piping system 10 more equally.

Eighth Embodiment

Figure 14:
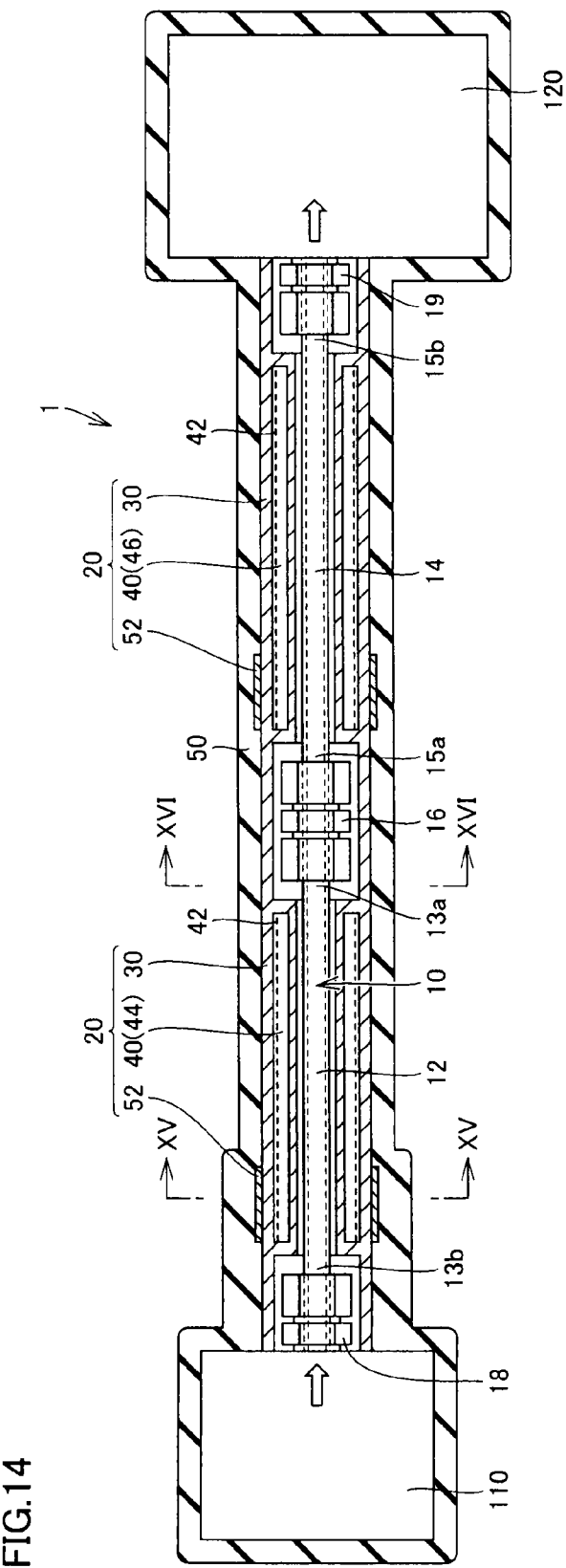
FIG. 14 is a schematic view showing a configuration of a heat transfer device according to an eighth embodiment.
Figure 15:
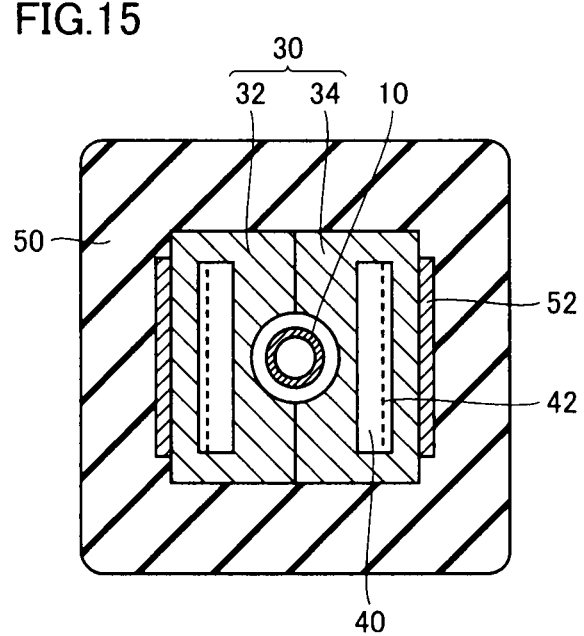
FIG. 15 is a cross-sectional view of the heat transfer device taken along line XV-XV in FIG. 14.
Figure 16:
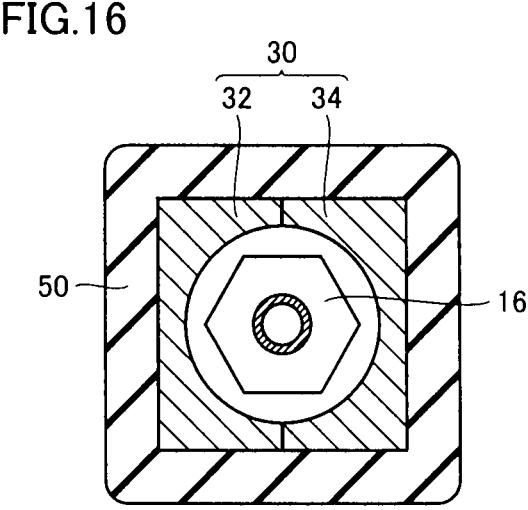
FIG. 16 is a cross-sectional view of the heat transfer device taken along line XVI-XVI in FIG. 14.

FIG. 14 is a schematic view showing a configuration of a heat transfer device according to an eighth embodiment. FIG. 15 is a cross-sectional view of the heat transfer device taken along line XV-XV in FIG. 14. FIG. 16 is a cross-sectional view of the heat transfer device taken along line XVI-XVI in FIG. 14. Heat transfer device 20 according to the eighth embodiment is different from the heat transfer device according to the third embodiment described with reference to FIGS. 6 to 8 in terms of the shape of heat transfer block 30.

Specifically, in a cross section orthogonal to the extension direction of piping system 10 shown in FIGS. 15 and 16, heat transfer block 30 including a plurality of divided blocks 32 and 34 has a polygonal outer shape. Although heat transfer block 30 is formed to have a substantially square outer shape in the present embodiment, heat transfer block 30 can be formed to have an arbitrary polygonal outer shape.

Since heat transfer block 30 is formed to have a polygonal outer shape, especially a rectangular outer shape, formation of the channels in heat pipe 40 formed within integrated heat transfer block 30 surrounding entire piping system 10 including coupling unit 16 becomes easier. In piping system 10 of an actual apparatus, piping system 10 is not always formed to have a shape of a straight pipe. For example, coupling unit 16 may couple a pipe extending in different directions, such as a T-joint having a T-shaped branch.

Heat transfer block 30 is formed to have a polygonal shape and heat transfer block 30 is formed to have a planar outer surface, and thereby a surface, facing the pipe, of hollow portion 40 formed in heat transfer block 30 can be formed to be planar. In consideration of formation of heat transfer block 30 in accordance with the shape of the pipe of the actual apparatus extending in different directions, the hollow portion in which heat pipe 40 is formed and whose surface facing the pipe is formed to be planar can be implemented with higher possibility, in terms of ease of maintaining continuity of the hollow portion and ease of processing the hollow portion, than the hollow portion whose semi-cylindrical shape surrounding the pipe is conformed to the shape of the pipe of the actual apparatus extending in different directions. Therefore, in this case, heat transfer block 30 having a polygonal cross-sectional shape is more preferable than heat transfer block 30 having a round cross-sectional shape.

In addition, the hollow portion formed within heat transfer block 30, in which heat pipe 40 is formed, can have a rectangular cross-sectional shape as shown in FIG. 15. Moreover, heater 52 is placed to be in contact with the planar outer circumferential surface of heat transfer block 30. The rectangular hollow portion and heater 52 in contact with the plane as described above can be easily fabricated as compared with the semi-annular hollow portion and the heater in contact with the cylindrical surface as described in the third embodiment. Therefore, ease of fabrication of heat transfer device 20 can be enhanced, and thus, the manufacturing cost of heat transfer device 20 can be reduced.

Figure 17:
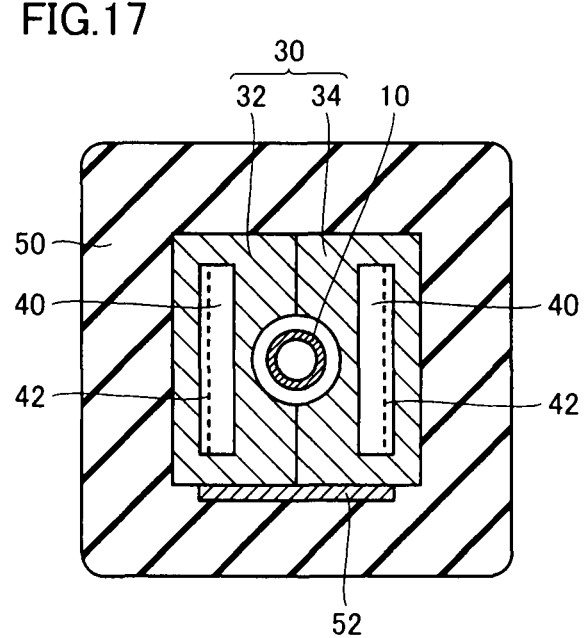
FIG. 17 is a schematic view showing another example of the configuration of the heat transfer device according to the eighth embodiment.

FIG. 17 is a schematic view showing another example of the configuration of the heat transfer device according the eighth embodiment. Heater 52 may be arranged to be capable of heating and vaporizing the liquid-phase working fluid retained in the lowest portion of heat pipe 40. Thus, as shown in FIG. 17, heater 52 can be arranged to be in contact with the outer surface on the lower surface side of heat transfer block 30 having a substantially square cross-sectional shape. With such a configuration, the number of heater 52 can be reduced as compared with heat transfer device 20 shown in FIG. 15, and thus, the cost of heat transfer device 20 can be reduced.

Ninth Embodiment

Figure 18:
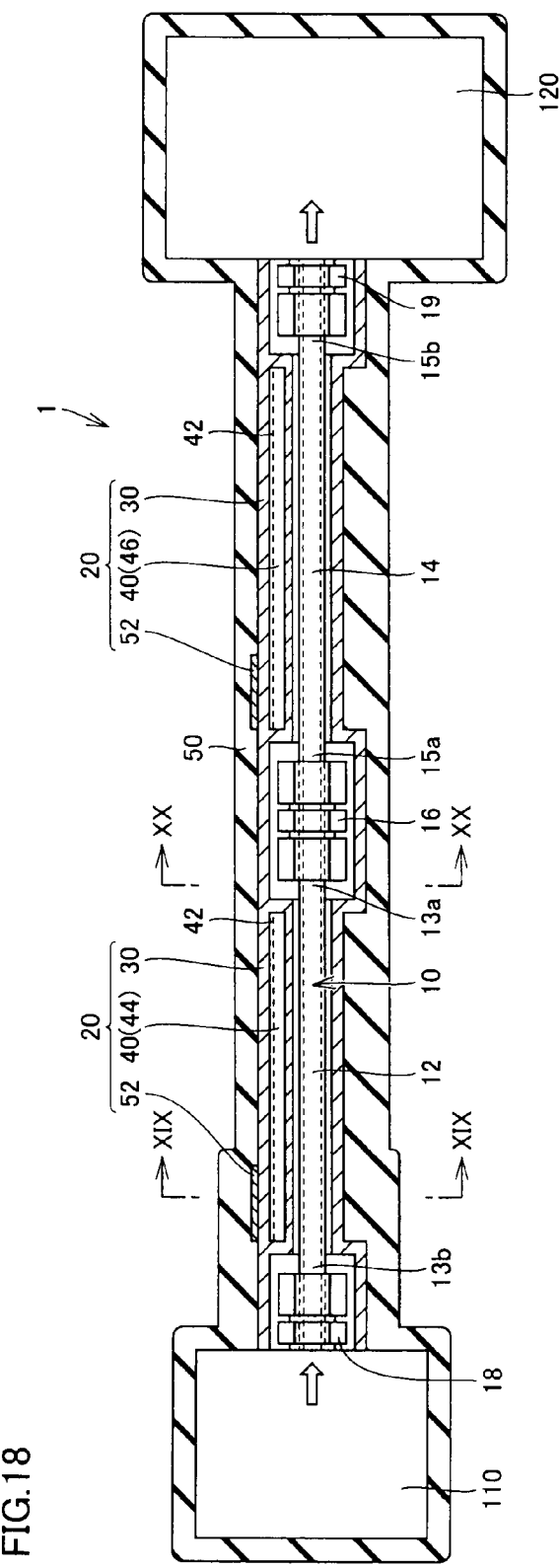
FIG. 18 is a schematic view showing a configuration of a heat transfer device according to a ninth embodiment.
Figure 19:
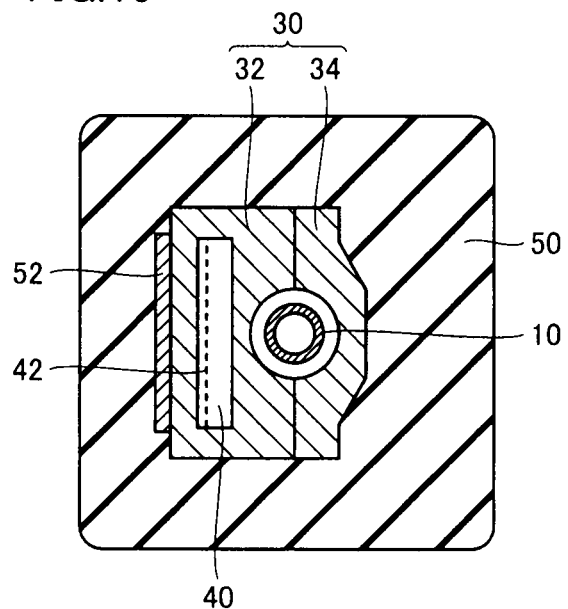
FIG. 19 is a cross-sectional view of the heat transfer device taken along line XIX-XIX in FIG. 18.
Figure 20:
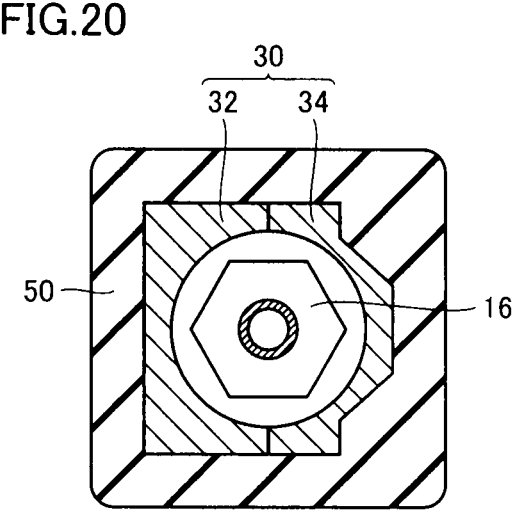
FIG. 20 is a cross-sectional view of the heat transfer device taken along line XX-XX in FIG. 18.

FIG. 18 is a schematic view showing a configuration of a heat transfer device according to a ninth embodiment. FIG. 19 is a cross-sectional view of the heat transfer device taken along line XIX-XIX in FIG. 18. FIG. 20 is a cross-sectional view of the heat transfer device taken along line XX-XX in FIG. 18. As shown in FIGS. 19 and 20, heat transfer block 30 has a polygonal outer shape as in the eighth embodiment. As shown in the figures, the polygonal shape is not limited to a convex polygon such as the rectangular described in the eighth embodiment, and includes a concave polygon as well.

Heat transfer block 30 includes a plurality of divided blocks 32 and 34. Heat pipe 40 is formed in only one of the plurality of divided blocks 32 and 34. As shown in FIG. 19, in heat transfer block 30 in the ninth embodiment, heat pipe 40 is provided in the hollow portion formed in one divided block 32 of two divided blocks 32 and 34, and the other divided block 34 is formed to be solid. Since divided block 34 in which heat pipe 40 is not provided does not have the hollow portion, reduction in the size of divided block 34 can be achieved.

With such a configuration, reduction in the size of heat transfer block 30 can be achieved as compared with such a configuration that heat pipe 40 is embedded in each of the plurality of divided blocks 32 and 34. Therefore, effects such as reduction in the weight, the heat capacity and the cost of heat transfer block 30 can be obtained more significantly.

Figure 21:
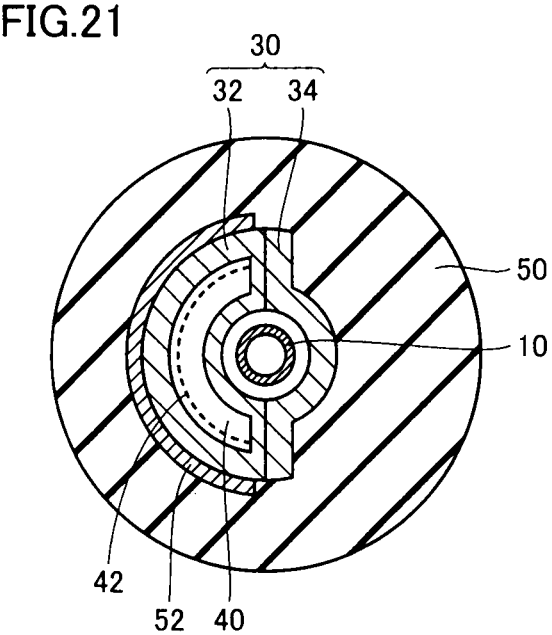
FIG. 21 is a schematic view showing another example of the configuration of the heat transfer device according to the ninth embodiment.

FIG. 21 is a schematic view showing another example of the configuration of the heat transfer device according to the ninth embodiment. As shown in FIG. 21, heat pipe 40 may be embedded in only one of the plurality of divided blocks 32 and 34 included in heat transfer block 30 having an annular cross-sectional shape as described in the first and third embodiments. The advantageous effect of reduction in the size of heat transfer block 30 equivalent to the above is obtained.

Tenth Embodiment

Figure 22:
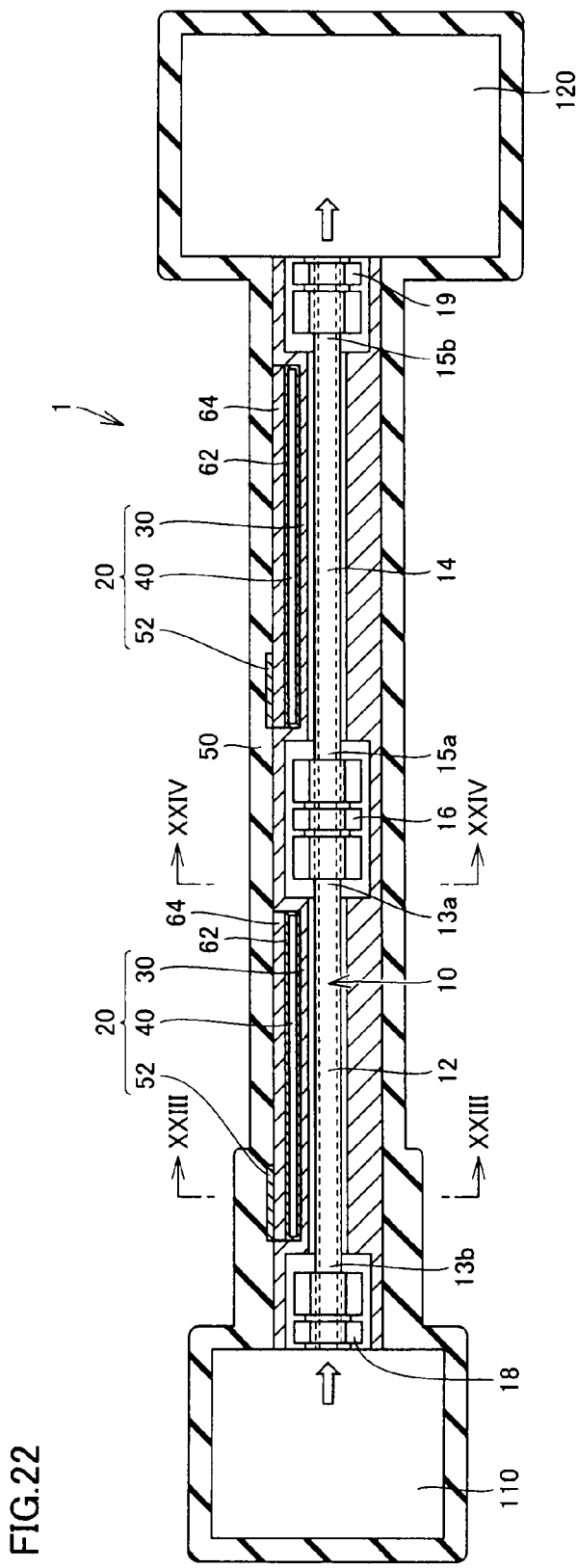
FIG. 22 is a schematic view showing a configuration of a heat transfer device according to a tenth embodiment.
Figure 23:
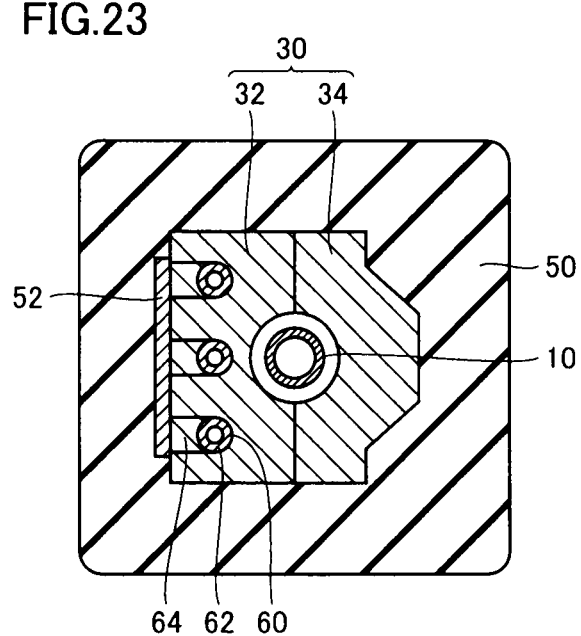
FIG. 23 is a cross-sectional view of the heat transfer device taken along line XXIII-XXIII in FIG. 22.
Figure 24:
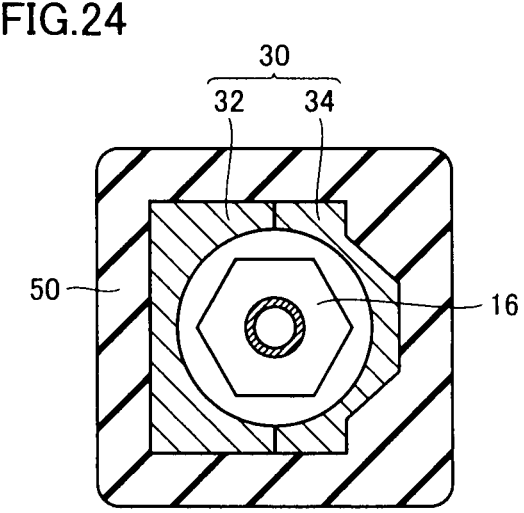
FIG. 24 is a cross-sectional view of the heat transfer device taken along line XXIV-XXIV in FIG. 22.

FIG. 22 is a schematic view showing a configuration of a heat transfer device according to a tenth embodiment. FIG. 23 is a cross-sectional view of the heat transfer device taken along line XXIII-XXIII in FIG. 22. FIG. 24 is a cross-sectional view of the heat transfer device taken along line XXIV-XXIV in FIG. 22. Heat transfer device 20 according to the tenth embodiment is different from the heat transfer devices according to the first to ninth embodiments in terms of the configuration of heat pipe 40.

Specifically, a groove portion 60 is formed in the outer circumferential surface of heat transfer block 30 in the tenth embodiment. Heat pipe 40 includes a pipe member 62. Pipe member 62 is embedded in groove portion 60. Pipe member 62 is evacuated and the working fluid is retained in pipe member 62, thereby forming heat pipe 40. Groove portion 60 is filled with a heat conductive filler and a surface of groove portion 60 is in thermal contact with pipe member 62 with the filler interposed therebetween. As a result, the heat transfer rate from pipe member 62 to heat transfer block 30 is increased. Since pipe member 62 is arranged, and then, a lid member 64 is fitted into groove portion 60, pipe member 62 is reliably held within groove portion 60.

A copper pipe excellent in the heat conductivity is used as pipe member 62. In the example shown in FIG. 23, groove portions 60 are formed at three locations in heat transfer block 30 and three pipe members 62 are embedded in respective groove portions 60. The number of groove portion 60 to be formed and the number of pipe member 62 may be arbitrary. Although lid members 64 are fitted into respective groove portions 60, lid member 64 may have an arbitrary shape, and lid member 64 extending over groove portions 60 at three locations to be capable of holding all of three pipe members 62 may be provided. In addition, a method for joining lid member 64 and heat transfer block 30 is also arbitrary and lid member 64 can be attached to heat transfer block 30 by, for example, welding, brazing and the like.

Since heat pipe 40 including pipe member 62 of the copper pipe is embedded in groove portion 60 formed in heat transfer block 30 as described above, processing of heat pipe 40 becomes easier. In other words, the joining process such as welding and brazing for forming the hollow portion in heat transfer block 30 becomes unnecessary.

In addition, since pipe member 62 is formed of the copper pipe, water excellent in the thermal property can be used as the working fluid in heat pipe 40. If heat transfer block 30 is made of aluminum and heat is transferred to heat transfer block 30 by heat pipe 40 including the hollow portion formed within heat transfer block 30, water cannot be used as the working fluid in heat pipe 40, and the working fluid such as dehydrated alcohol and fluorine-based liquid that does not react on aluminum must be used. Since pipe member 62 formed of the copper pipe is embedded in heat transfer block 30, water excellent in the thermal property can be used as the working fluid even when heat transfer block 30 is made of aluminum.

Eleventh Embodiment

Figure 25:
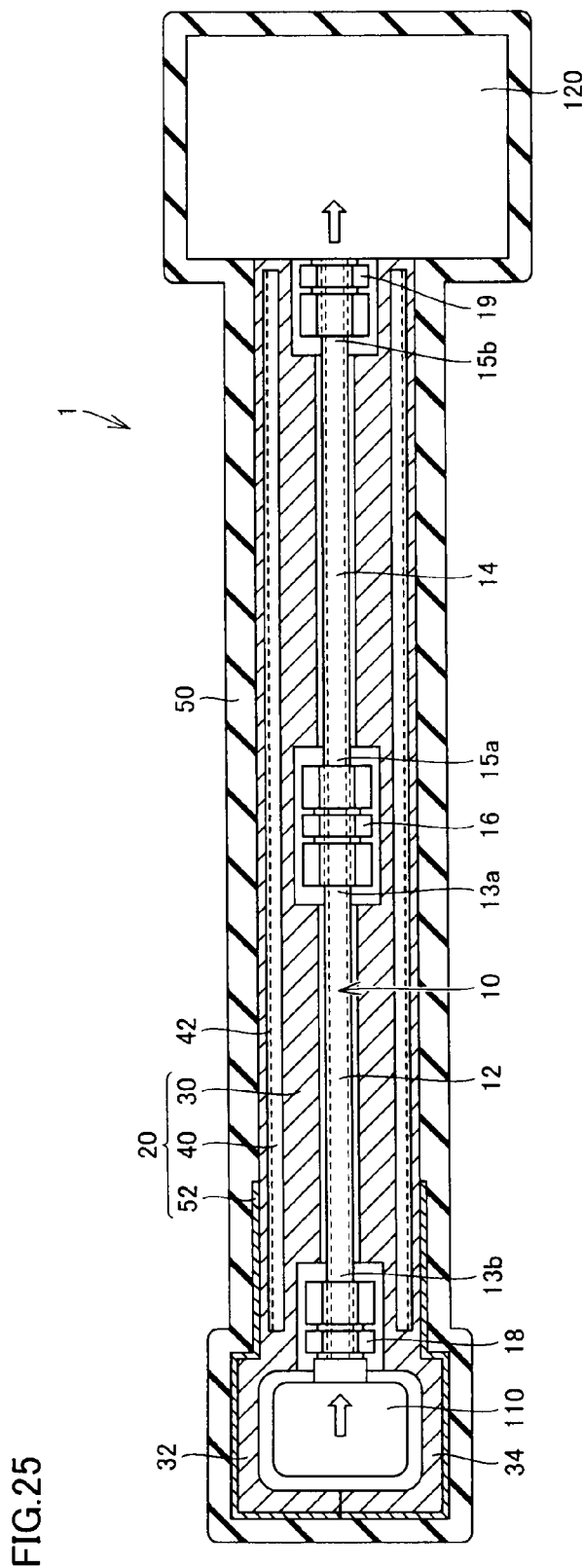
FIG. 25 is a schematic view showing a configuration of a heat transfer device according to an eleventh embodiment.

FIG. 25 is a schematic view showing a configuration of a heat transfer device according to an eleventh embodiment. In heat transfer device 20 according to the eleventh embodiment as shown in FIG. 25, heat transfer block 30 surrounds equipment 110 coupled to the end of piping system 10. The heat transfer block covering equipment 110 and the heat transfer block transferring heat to piping system 10 are formed as integrated heat transfer block 30.

Heater 52 is in contact with the outer circumferential surface of heat transfer block 30 and in thermal contact with heat transfer block 30. Heater 52 may be embedded in heat transfer block 30. Heat transfer block 30 is integrated, and integrated heater 52 heats heat pipe 40 through heat transfer block 30 and heats equipment 110 by heat conduction within heat transfer block 30. Therefore, temperature control over equipment 110 in addition to piping system 10 is also possible using integrated heater 52, and thus, heater 52 can be easily controlled.

Heat transfer block 30 may have any shapes as described before as long as heat transfer block 30 includes heat transfer blocks 32 and 34 covering equipment 110. In other words, the structure of heat pipe 40 in heat transfer block 30 is arbitrary, and the number and the arrangement of heater 52 are also arbitrary. In addition, heat transfer block 30 may have a round or rectangular cross-sectional shape.

In some cases, heater 52 should not be provided around equipment 110, such as the case where equipment 110 is a valve. In such a case, heat may be transferred to equipment 110 by heat conduction from heater 52 heating heat pipe 40 around first pipe 12 through heat transfer block 30, without bringing heater 52 into contact with the outer circumferential surface of heat transfer block 30 surrounding equipment 110. In addition, heat pipe 40 may be arranged to reach the inside of heat transfer block 30 covering equipment 110. With such a configuration, the temperature of piping system 10 and equipment 110 can be controlled more easily by the heat equalizing function of heat pipe 40, and the uniformity of the temperature of piping system 10 and equipment 110 can be enhanced.

Although heating of piping system 10 with heat pipe 40 has been described in the description of the first to eleventh embodiments, a cooler positively removing heat from heat pipe 40 and cooling the working fluid in heat pipe 40 may be provided to be in thermal contact with heat pipe 40. An arbitrary cooler such as, for example, an air-cooled or water-cooled channel and a Peltier element is applicable as the cooler.

If heating of heat pipe 40 with heater 52 is stopped, and then, the heat pipe is cooled with the cooler, entire heat pipe 40 can be efficiently cooled by cooling only a part of heat pipe 40. With such a configuration, when lowering the temperature of piping system 10 is desired such as at the time of changing the temperature setting or at the time of maintenance, the temperature of piping system 10 can be uniformly lowered more quickly. Therefore, the time required for lowering the temperature of the pipe can be shortened and the maintenance time can be shortened.

While the embodiments of the present invention have been explained, respective features of the embodiments may be combined as appropriate. It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

INDUSTRIAL APPLICABILITY

The heat transfer device according to the present invention is advantageously applicable especially to a heat transfer device transferring heat to a piping system of a fluid conveying apparatus conveying a substance requiring high-accuracy temperature management, such as, for example, reaction gas for forming a film on a semiconductor wafer, a liquid crystal glass substrate and the like.

REFERENCE SIGNS LIST

1 fluid conveying apparatus; 10 piping system; 12 first pipe; 13a, 15a one end; 13b, 15b the other end; 14 second pipe; 16, 18, 19 coupling unit; 20 heat transfer device; 30 heat transfer block; 31 tubular space; 32, 34 divided block; 36 first block; 38 second block; 39 coupling block; 40 heat pipe; 42 wick; 44 first channel; 45, 47 end; 46 second channel; 48 third channel; 50 heat insulator; 52 heater; 53 first heat source; 54 second heat source; 60 groove portion; 62 pipe member; 64 lid member; 110, 120 equipment

The invention claimed is:

1. A heat transfer device transferring heat to a piping system through which a fluid flows, comprising:
    a high heat conductive heat transfer block surrounding said piping system;
    a heat pipe formed in said heat transfer block along an extension direction of said piping system; and
    a heating unit applying heat to said heat pipe,
    wherein said heat transfer block includes a plurality of divided blocks dividable along the extension direction of said piping system, and
    wherein the heat pipe includes an evacuated and decompressed vacuum space and a wick provided on an inner surface of the vacuum space, the wick having capillary force.

2. The heat transfer device according to claim 1, wherein
    said piping system includes a first pipe, a second pipe, and a coupling unit coupling one end of said first pipe and one end of said second pipe, and
    said heat pipe extends from the other end of said first pipe to the other end of said second pipe.

3. The heat transfer device according to claim 2, wherein
    said coupling unit is larger in outer diameter than said first pipe and said second pipe, and
    a tubular space extending along the extension direction of said piping system is formed at a portion closer to said piping system than said heat pipe in said heat transfer block.

4. The heat transfer device according to claim 1, wherein
    said piping system includes a first pipe, a second pipe, and a coupling unit coupling one end of said first pipe and one end of said second pipe,
    said coupling unit is larger in outer diameter than said first pipe and said second pipe, and
    said heat pipe includes a first channel embedded along said first pipe and a second channel embedded along said second pipe.

5. The heat transfer device according to claim 4, wherein said heating unit is in thermal contact with said heat transfer block surrounding said coupling unit.

6. The heat transfer device according to claim 4, wherein said heating unit includes a first heat source heating an end of said first channel on a side close to said coupling unit, and a second heat source heating an end of said second channel on a side close to said coupling unit.

7. The heat transfer device according to claim 4, wherein
    said heat transfer block includes a first block having said first channel embedded therein, a second block having said second channel embedded therein, and a coupling block surrounding said coupling unit, and
    said heating unit is in thermal contact with said coupling block.

8. The heat transfer device according to claim 7, wherein said heat pipe includes a third channel embedded in said coupling block.

9. The heat transfer device according to claim 1, wherein said heat pipe is formed in only one of said divided blocks.

10. The heat transfer device according to claim 1, wherein said heat transfer block has a polygonal outer shape in a cross section orthogonal to the extension direction of said piping system.

11. The heat transfer device according to claim 1, wherein said evacuated and decompressed vacuum space of the heat pipe is a hollow portion formed within said heat transfer block, and a working fluid retained in said hollow portion.

12. The heat transfer device according to claim 1, wherein
    a groove portion is formed in an outer circumferential surface of said heat transfer block, and
    said heat pipe includes a pipe member embedded in the groove portion and evacuated, and a working fluid retained in said pipe member.

13. The heat transfer device according to claim 1, further comprising
    equipment coupled to an end of said piping system, wherein
    said heat transfer block surrounds said equipment.

* * * * *